US012585781B2

(12) United States Patent
Chen et al.

(10) Patent No.: US 12,585,781 B2
(45) Date of Patent: Mar. 24, 2026

(54) SECURE BOOT METHOD AND APPARATUS

(71) Applicant: HUAWEI TECHNOLOGIES CO., LTD., Shenzhen (CN)

(72) Inventors: Haiwu Chen, Beijing (CN); Honghong Dong, Beijing (CN); Bin Cao, Bangkok (TH)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 72 days.

(21) Appl. No.: 18/469,807

(22) Filed: Sep. 19, 2023

(65) Prior Publication Data

US 2024/0005007 A1 Jan. 4, 2024

Related U.S. Application Data

(63) Continuation of application No. PCT/CN2021/142998, filed on Dec. 30, 2021.

(30) Foreign Application Priority Data

Mar. 25, 2021 (CN) .......................... 202110321006.9

(51) Int. Cl.
G06F 21/57 (2013.01)
G06F 21/60 (2013.01)
G06F 21/64 (2013.01)

(52) U.S. Cl.
CPC .......... G06F 21/575 (2013.01); G06F 21/602 (2013.01); G06F 21/64 (2013.01)

(58) Field of Classification Search
CPC ...... G06F 21/575; G06F 21/602; G06F 21/64; G06F 11/10
See application file for complete search history.

(56) References Cited

U.S. PATENT DOCUMENTS 9,887,836 B1 * 2/2018 Roth ....................... H04L 9/088
2004/0064457 A1 * 4/2004 Zimmer ................ G06F 21/575
(Continued)

FOREIGN PATENT DOCUMENTS

CN 103902915 A 7/2014
EP 2746982 A1 6/2014

OTHER PUBLICATIONS

Post-Quantum Cryptography: What Advancements in Quantum Computing Mean for IT Professionals (Year: 2016).*
(Continued)

*Primary Examiner* — Kim Huynh
(74) *Attorney, Agent, or Firm* — Maier & Maier, PLLC

(57) ABSTRACT

A secure boot method. The method may be performed by a communication device. According to the method, the communication device can flexibly perform secure boot by using different cryptographic algorithms based on different security requirements, to ensure security of the communication device. The communication device may obtain external secure boot code (ESBC). The ESBC includes a code segment of a first cryptographic algorithm. After the ESBC is obtained, the communication device may perform an integrity check on the ESBC, and after the integrity check on the ESBC succeeds, verify a signature of next-level software based on the first cryptographic algorithm. When a cryptographic algorithm used by the communication device cannot meet a security requirement, the ESBC may be obtained, and the first cryptographic algorithm included in the ESBC is used to perform the secure boot, to meet the security requirement.

18 Claims, 3 Drawing Sheets

(56) References Cited

U.S. PATENT DOCUMENTS

| | | | |
|---|---|---|---|
| 2006/0107320 A1 | 5/2006 | Bhatt et al. | |
| 2007/0192610 A1* | 8/2007 | Chun | G06F 21/575 |
| | | | 713/176 |
| 2007/0283140 A1 | 12/2007 | Jones et al. | |
| 2007/0300207 A1 | 12/2007 | Booth et al. | |
| 2009/0019275 A1* | 1/2009 | Park | G06F 21/575 |
| | | | 726/2 |
| 2012/0210115 A1 | 8/2012 | Park et al. | |
| 2013/0152180 A1* | 6/2013 | Nair | G06F 21/575 |
| | | | 726/26 |
| 2014/0026124 A1* | 1/2014 | Gilbert | G06F 11/3688 |
| | | | 717/124 |
| 2016/0316368 A1* | 10/2016 | Gan | H04W 12/06 |
| 2017/0364701 A1* | 12/2017 | Struttmann | G06F 21/6218 |
| 2017/0372073 A1* | 12/2017 | Gunti | G06F 21/575 |
| 2017/0372074 A1 | 12/2017 | Gunti et al. | |
| 2020/0097658 A1* | 3/2020 | Samuel | G06F 11/0793 |
| 2021/0019419 A1* | 1/2021 | Mathane | G06F 9/445 |
| 2022/0137846 A1* | 5/2022 | Feng | G06F 3/0679 |
| | | | 711/154 |

OTHER PUBLICATIONS

Factoring RSA Keys in the IoT Era (Year: 2019).*
Cisco, "Post-Quantum Trust Anchors", Security and Trust in a Post-Quantum Computing World, Post-Quantum Trust Anchors White Paper, Cisco, 2024, 4 pages.
TCG, "TCG Guidance for Securing Network Equipment Using TCG Technology", TCG Published, Jan. 17, 2018, Version 1.0, Revision 29, 58 pages.
TCG, "TCG Roots of Trust Specification", TCG Public Review, Jul. 9, 2018, Family "1.0", Level 00 Revision 0.20, 20 pages.
TCG, "Trusted Platform Module Library Part 1: Architecture", TCG Published, Nov. 8, 2019, Family "2.0", Level 00 Revision 01.59, 306 pages.

* cited by examiner

Perform                    Perform                    Perform

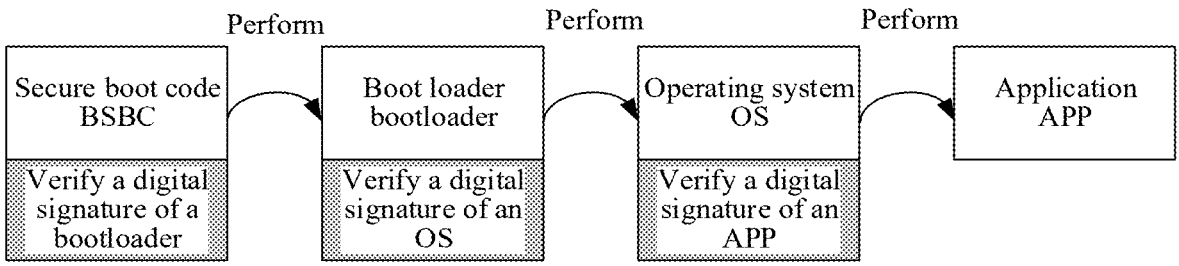

| Secure boot code BSBC | Boot loader bootloader | Operating system OS | Application APP |

| Verify a digital signature of a bootloader | Verify a digital signature of an OS | Verify a digital signature of an APP | |

FIG. 1

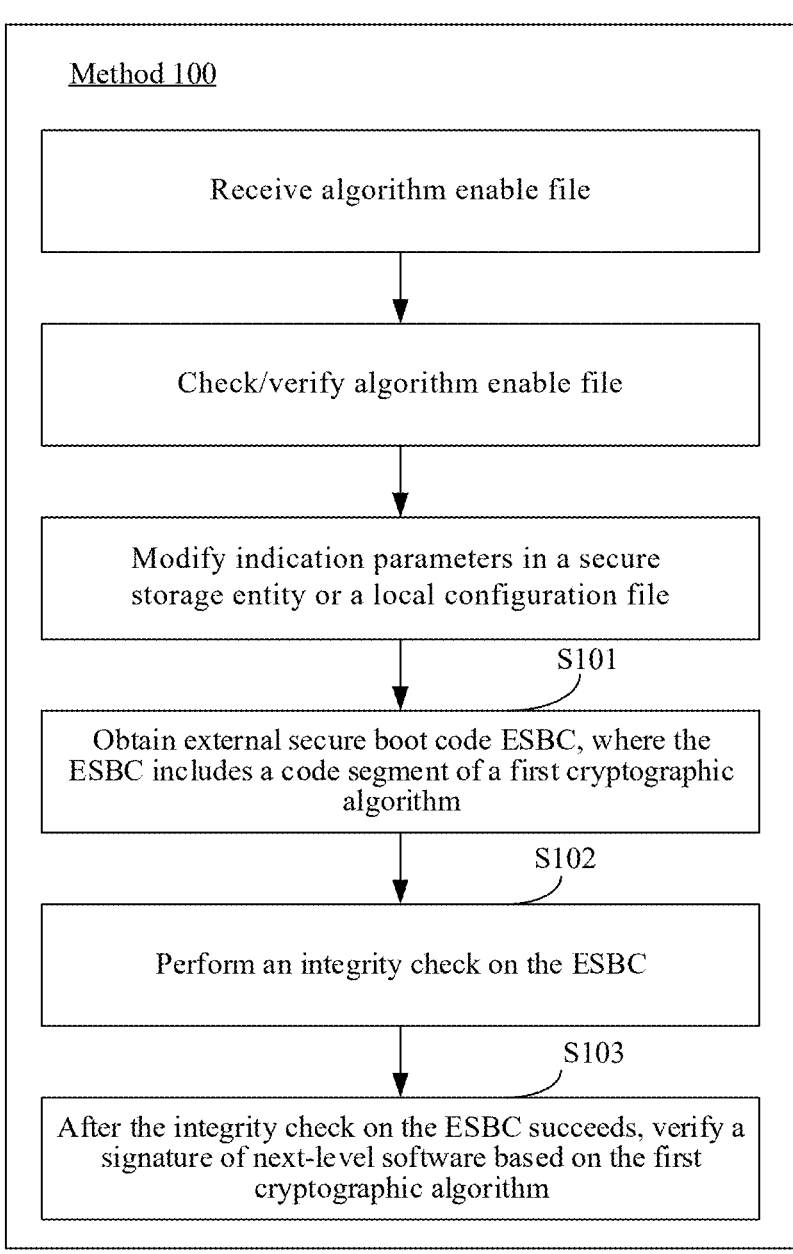

Method 100

Receive algorithm enable file

Check/verify algorithm enable file

Modify indication parameters in a secure storage entity or a local configuration file

S101

Obtain external secure boot code ESBC, where the ESBC includes a code segment of a first cryptographic algorithm

S102

Perform an integrity check on the ESBC

S103

After the integrity check on the ESBC succeeds, verify a signature of next-level software based on the first cryptographic algorithm

FIG. 2

Method 200                                    S201

In a first communication period, perform secure boot
based on a second cryptographic algorithm preset in a
first device

S202

In a second communication period, perform secure boot
based on a first cryptographic algorithm obtained from
the outside of the first device

400

Secure boot apparatus

Obtaining unit                    401

Processing unit                   402

SECURE BOOT METHOD AND APPARATUS

CROSS-REFERENCE TO RELATED APPLICATIONS

This application is a continuation of International Application No. PCT/CN2021/142998, filed on Dec. 30, 2021, which claims priority to Chinese Patent Application No. 202110321006.9, filed on Mar. 25, 2021. The disclosures of the aforementioned applications are hereby incorporated by reference in their entireties.

TECHNICAL FIELD

The embodiments relate to the field of data security, a secure boot method, and an apparatus.

BACKGROUND

To ensure security of a network device in a boot process, a secure boot technology may be used. In a secure boot process, a to-be-loaded image file of an application is first verified, and the image file of the application is loaded only after the verification succeeds. In this way, integrity and authority of the loaded image file of the application in the boot process are ensured.

Currently, the network device may store a cryptographic algorithm for secure boot, for example, an asymmetric cryptographic algorithm related to RSA, error checking and correcting (ECC), and the like. When the cryptographic algorithm cannot meet a higher security requirement, or the cryptographic algorithm does not meet security requirements of some users, the network device cannot perform security protection on software integrity during boot by using the secure boot technology. Consequently, security of the network device is threatened.

SUMMARY

The embodiments may provide a secure boot method, so that a communication device can flexibly perform secure boot by using different cryptographic algorithms based on different security requirements, to ensure security of the communication device. For example, in a post-quantum era, a quantum computer will be widely used. The quantum computer is good at reverse computing and parallel computing, finding a solution matching a condition from huge data space, and simulating microscopic time by using characteristics of the parallel computing. Currently, all asymmetric cryptographic algorithms widely applied in a secure software boot process cannot resist a post-quantum attack. In other words, the quantum computer can crack the asymmetric cryptographic algorithms widely applied in the current secure software boot process. According to the method, that the communication device can cope with a possible post-quantum attack at any time can be effectively ensured.

According to a first aspect, an embodiment may provide a secure boot method. For example, the method may be executed by a communication device. In an example, the communication device may obtain external secure boot code (ESBC). The ESBC includes a code segment of a first cryptographic algorithm. After the ESBC is obtained, the communication device may perform an integrity check on the ESBC, and after the integrity check on the ESBC succeeds, verify a signature of next-level software based on the first cryptographic algorithm. It can be understood that, according to this solution, when a cryptographic algorithm used for secure boot of the communication device at delivery cannot meet a security requirement, the ESBC may be obtained, and the first cryptographic algorithm included in the ESBC is used to perform the secure boot, to meet the security requirement. In an example, even if a post-quantum era comes, and a cryptographic algorithm currently used for the secure boot cannot resist a post-quantum attack, the communication device may alternatively obtain the ESBC including the first cryptographic algorithm, to verify the signature of the next-level software based on the first cryptographic algorithm. In an example, the first cryptographic algorithm may be an algorithm for resisting the post-quantum attack. In this way, after the ESBC including the first cryptographic algorithm is obtained, the signature of the next-level software may be verified by using the first cryptographic algorithm for resisting the post-quantum attack. It can be understood that, according to this solution, the communication device can cope with a possible post-quantum attack at any time.

According to a second aspect, an embodiment may provide a secure boot method. For example, the method may be executed by a communication device. In an example, a first device may perform secure boot based on a second cryptographic algorithm in a first communication period, and perform, in a second communication period, the secure boot based on a first cryptographic algorithm obtained from outside of the first device. It can be understood that, according to this solution, when the second cryptographic algorithm cannot meet a security requirement, the first cryptographic algorithm may be obtained from the outside, and the secure boot is performed based on the first cryptographic algorithm, to meet the security requirement. In an example, even if a post-quantum era comes, and a cryptographic algorithm currently used for the secure boot cannot resist a post-quantum attack, the communication device may alternatively obtain the first cryptographic algorithm from the outside, to verify a signature of next-level software based on the first cryptographic algorithm. In an example, the first cryptographic algorithm may be an algorithm for resisting the post-quantum attack. In this way, after the first cryptographic algorithm is obtained from the outside, the signature of the next-level software may be verified by using the first cryptographic algorithm for resisting the post-quantum attack. It can be understood that, according to this solution, the communication device can cope with a possible post-quantum attack at any time.

In an implementation, before the signature of the next-level software is verified by using the first cryptographic algorithm, the method further includes: obtaining external secure boot code ESBC, where the ESBC includes a code segment of the first cryptographic algorithm; and performing an integrity check on the ESBC. Correspondingly, that the signature of the next-level software is verified based on the first cryptographic algorithm includes: after the integrity check on the ESBC succeeds, verifying the signature of the next-level software based on the first cryptographic algorithm.

In an implementation, the second cryptographic algorithm is a cryptographic algorithm preset before delivery of the communication device. In this way, when the second cryptographic algorithm used for the secure boot of the communication device at delivery cannot meet the security requirement, the first cryptographic algorithm may be used to perform the secure boot, to meet the security requirement.

The first aspect and the second aspect include the following.

In an implementation, the ESBC may be stored in an external storage entity independent of a processor. For example, the ESBC may be stored in a non-volatile storage medium. Therefore, in an example, after determining to use the first cryptographic algorithm for the secure boot, the communication device may store the ESBC stored in the non-volatile storage medium into a SRAM of the processor, and obtain the ESBC from the SRAM, to subsequently perform the integrity check on the ESBC, and after the integrity check on the ESBC succeeds, verify the signature of the next-level software by using the first cryptographic algorithm.

In an implementation, in addition to the code segment of the first cryptographic algorithm, the ESBC may further include a root public key baseline value. The root public key baseline value is for performing integrity verification on a root public key of the first cryptographic algorithm. In this case, before verifying the signature of the next-level software based on the first cryptographic algorithm, the communication device may further perform integrity verification on the root public key of the first cryptographic algorithm based on the root public key baseline value.

In an implementation, when verifying the signature of the next-level software, the communication device may use a secondary public key of the first cryptographic algorithm. In this case, a public key certificate may further include the secondary public key and a signature of the public key certificate. In this case, the communication device may verify the signature of the public key certificate by using the verified root public key, to determine validity and integrity of the secondary public key. After the verification on the public key certificate succeeds, the signature of the next-level software may be verified by using the first cryptographic algorithm and the secondary public key of the first cryptographic algorithm.

In an implementation, when the integrity check is performed on the ESBC, the integrity check may be performed on the ESBC by using a baseline value of the ESBC. A secure storage entity may pre-store the baseline value of the ESBC. In this way, the communication device may obtain the baseline value of the ESBC stored in the secure storage entity, and then perform integrity verification on the ESBC by using the baseline value of the ESBC.

In an implementation, the secure storage entity is a one-time programmable memory in the processor or a security chip in the processor.

In an implementation, before verifying the signature of the next-level software based on the first cryptographic algorithm, the communication device may further enable, in the processor, the first cryptographic algorithm for secure boot. In this way, it can be ensured that before verifying the signature of the next-level software based on the first cryptographic algorithm, the communication device ensures that the first cryptographic algorithm can be used.

In an implementation, the secure storage entity of the communication device may store indication information. The indication information can indicate that the first cryptographic algorithm is enabled. In this case, after reading the indication information from the secure storage entity, the communication device may determine that the first cryptographic algorithm is enabled for secure boot. Further, the communication device may verify the signature of the next-level software based on the first cryptographic algorithm.

In an implementation, the communication device uses the second cryptographic algorithm for secure boot before using the first cryptographic algorithm for secure boot, that is, before using the first cryptographic algorithm for secure boot, the communication device uses the second cryptographic algorithm to verify the signature of the next-level software. In this case, after the first cryptographic algorithm is used for secure boot, the second cryptographic algorithm may be further forbidden to be used for secure boot, to avoid a case in which two cryptographic algorithms are enabled for secure boot at the same time and that affects normal secure boot of the communication device.

In an implementation, for a communication device including a processor system, for example, a CPU system, a BIOS is the $1^{st}$ piece of software loaded when a CPU runs. Therefore, the communication device may use the first cryptographic algorithm to verify a signature of the BIOS during implementation of using the first cryptographic algorithm to verify the signature of the next-level software.

In an implementation, after the verification on the BIOS succeeds, the communication device may continue to verify a signature of OS code by using the first cryptographic algorithm and the corresponding public key. After the verification on the signature of the OS code succeeds, the communication device may load an OS, and continue to verify a signature of an APP by using the first cryptographic algorithm and the corresponding public key. After the verification on the signature of the APP succeeds, the communication device may securely load the APP.

According to a third aspect, an embodiment may provide a secure boot apparatus. The apparatus includes: an obtaining unit, configured to obtain external secure boot code ESBC, where the ESBC includes a code segment of a first cryptographic algorithm; and a processing unit, configured to perform an integrity check on the ESBC, where the processing unit is further configured to: after the integrity check on the ESBC succeeds, verify a signature of next-level software based on the first cryptographic algorithm.

In an implementation, the ESBC further includes a root public key baseline value, and the processing unit is further configured to perform integrity verification on a root public key of the first cryptographic algorithm based on the root public key baseline value before verifying the next-level software based on the first cryptographic algorithm.

In an implementation, the processing unit is further configured to: after performing integrity verification on the root public key of the first cryptographic algorithm, verify a signature of a public key certificate based on the root public key of the first cryptographic algorithm, where the public key certificate includes a secondary public key of the first cryptographic algorithm; and the verifying a signature of next-level software based on the first cryptographic algorithm includes: after the verification on the signature of the public key certificate succeeds, verifying the signature of the next-level software based on the first cryptographic algorithm and the secondary public key.

In an implementation, the first cryptographic algorithm is a post-quantum algorithm for resisting a post-quantum attack.

In an implementation, the performing an integrity check on the ESBC includes: performing the integrity check on the ESBC based on a baseline value of the ESBC stored in a secure storage entity.

In an implementation, the secure storage entity is a one-time programmable memory in a processor or a security chip in the processor.

In an implementation, the processing unit is further configured to: before verifying the signature of the next-level software based on the first cryptographic algorithm, enable, in the processor, the first cryptographic algorithm for secure boot.

In an implementation, the enabling, in the processor, the first cryptographic algorithm for secure boot includes: obtaining indication information, where the indication information indicates that the first cryptographic algorithm is enabled for the secure boot.

In an implementation, the processing unit is further configured to: after performing the integrity check on the ESBC, forbid, in the processor, use of a second cryptographic algorithm for the secure boot, where the second cryptographic algorithm is for verifying the signature of the next-level software before the first cryptographic algorithm is enabled.

In an implementation, the verifying a signature of next-level software based on the first cryptographic algorithm includes: verifying a signature of basic input/output system BIOS code based on the first cryptographic algorithm.

In an implementation, the processing unit is further configured to: verify a signature of operating system OS code based on the first cryptographic algorithm; and verify, based on the first cryptographic algorithm, a signature of an application APP loaded by the OS.

In an implementation, the obtaining unit is configured to: obtain the ESBC from a static random access memory SRAM of the processor.

In an implementation, the processing unit is further configured to: before obtaining the ESBC from the SRAM of the processor, store, in the SRAM, the external secure boot code ESBC stored in a non-volatile storage medium.

According to a fourth aspect, the embodiments may provide a communication apparatus. The communication apparatus includes a memory and a processor. The memory is configured to store program code. The processor is configured to run instructions in the program code, so that the communication apparatus performs the method according to any one of the first aspect or the implementations of the first aspect, or the communication apparatus performs the method according to any one of the second aspect or the implementations of the second aspect.

According to a fifth aspect, an embodiment may provide a secure storage entity. The secure storage entity includes at least one reserved storage area. The at least one reserved storage area is for storing a baseline value of external secure boot code ESBC before a first cryptographic algorithm is enabled for secure boot, and the ESBC includes a code segment of the first cryptographic algorithm.

In an implementation, the secure storage entity is a one-time programmable memory or a security chip in a processor.

In an implementation, the secure storage entity is a one-time programmable memory eFuse, and the storage area is a slot in the eFuse.

According to a sixth aspect, an embodiment may provide provides a communication apparatus. The communication apparatus includes the secure storage entity according to any one of the implementations of the fifth aspect.

According to a seventh aspect, an embodiment may provide a computer storage medium. The computer-readable storage medium stores instructions, and when the instructions are run on a computer, the computer is enabled to perform the method according to the first aspect or the second aspect.

According to an eighth aspect, an embodiment may provide a computer program product, including a program.

When the program is run on a processor, the method according to the first aspect or the second aspect is implemented.

BRIEF DESCRIPTION OF THE DRAWINGS

To describe the embodiments more clearly, the following briefly describes the accompanying drawings. It is clear that the accompanying drawings in the following descriptions show some embodiments, and persons of ordinary skill in the art may still derive other drawings from these accompanying drawings without creative efforts.

FIG. 1 is a schematic diagram of an example application scenario;

FIG. 2 is a schematic flowchart of a secure boot method according to an embodiment;

DETAILED DESCRIPTION OF THE EMBODIMENTS

Figures 3, 4:
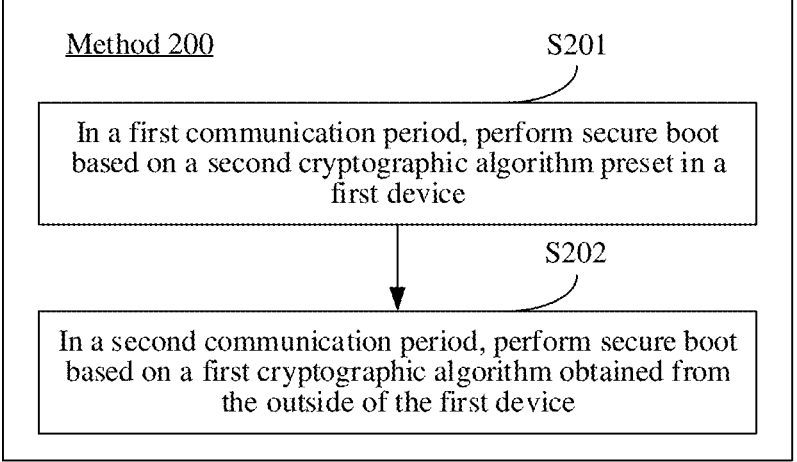
FIG. 3 is a schematic flowchart of a secure boot method according to an embodiment.
FIG. 4 is a schematic diagram of a structure of a secure boot apparatus according to an embodiment.

The embodiments may provide a secure boot method, so that a communication device can cope with a possible post-quantum attack at any time.

For ease of understanding, a technology related to secure boot is first briefly described.

FIG. 1 is a schematic diagram of an example application scenario.

A secure boot procedure shown in FIG. 1 is as follows: After a communication device is powered on, the communication device first starts secure boot code (BSBC) and verifies a digital signature of a bootloader by using a preset public key 1 and an algorithm 1. If the verification on the digital signature of the bootloader succeeds, the bootloader is loaded. After the bootloader is loaded, the bootloader verifies a digital signature of an operating system (OS) by using a preset public key 2 and the algorithm 1. If the verification on the digital signature of the OS succeeds, the OS verifies a digital signature of an application (APP) by using a preset public key 3 and the algorithm 1. If the verification on the digital signature of the APP succeeds, the APP may be loaded. The BSBC is secure boot code inside a chip, is a code segment fastened inside a processor, for example, a central processing unit (CPU), and may also be referred to as internal secure boot code (ISBC). The BSBC may be regarded as a root of trust (RoT) of the communication device. The RoT can be used to implement one or more security functions. For example, the RoT is used to implement security functions such as secure storage and security verification.

A manner of verifying the digital signature is not described in detail herein.

The communication device mentioned in this embodiment is a device having a communication function. For example, the communication device may be a network device, for example, a router or a switch. For another example, the communication device may be a terminal device. The communication device mentioned in this embodiment includes all devices that have security algorithm switching requirements.

Currently, the algorithm 1 used in the foregoing secure boot process may be RSA, an ECC algorithm, or another asymmetric cryptographic algorithm. However, in some scenarios, these cryptographic algorithms cannot meet better security requirements or do not meet security requirements of some users. For example, these asymmetric cryptographic algorithms cannot resist post-quantum attacks. A life cycle of a communication device may reach several years, and, for a network device, for example, a router, a communication period of the network device may reach several decades. Therefore, how to ensure that a cryptographic algorithm used by a communication device can always meet a security requirement, for example, before the post-quantum era arrives, how to ensure that the communication device can cope with a possible post-quantum attack at any time, is a problem to be resolved currently.

To resolve this problem, an embodiment may provide a secure boot method. The following describes the secure boot method with reference to the accompanying drawings.

In the following descriptions of the embodiments, "signature" is "digital signature", and the two may be used alternately.

FIG. 2 is a schematic flowchart of a secure boot method according to an embodiment. The secure boot method shown in FIG. 2 may be performed, for example, by a communication device.

The secure boot method 100 shown in FIG. 2 may include, for example, the following S101 to S103.

In an example, before performing S101 to S103, the communication device may first run BSBC. The BSBC may be run in a processor of the communication device. After running the BSBC, the communication device may determine, based on the BSBC, whether the communication device needs to perform secure boot, and determine whether a cryptographic algorithm used for the current secure boot is an asymmetric cryptographic algorithm, for example, RSA, or another cryptographic algorithm obtained from the outside.

In an example, the communication device may determine, based on a value of a related parameter stored in a secure storage entity, whether the communication device needs the secure boot. For example, the secure storage entity stores a parameter 1, and a value of the parameter 1 indicates whether the communication device needs the secure boot. In another example, the communication device may determine, based on configuration information 1, whether the communication device needs the secure boot. The configuration information 1 may include, for example, indication information that indicates whether the communication device needs the secure boot. For example, the configuration information 1 includes indication information 1. The indication information 1 indicates that the communication device needs the secure boot. For example, the configuration information 1 may be stored in the secure storage entity of the communication device.

In an example, the communication device may determine, based on a value of a related parameter stored in the secure storage entity, a cryptographic algorithm used when the communication device performs secure boot. In some embodiments, the secure storage entity stores a parameter 2, and a value of the parameter 2 indicates the cryptographic algorithm used when the communication device performs secure boot. For example, when the value of the parameter 2 is 0, default RSA is used during the secure boot of the communication device. When the value of the parameter 2 is 1, another cryptographic algorithm obtained from the outside is used during the secure boot of the communication device. In some other embodiments, the secure storage entity stores a parameter 2 and a parameter 2', and the parameter 2 and the parameter 2' jointly indicate a cryptographic algorithm used when the communication device performs secure boot. A value of the parameter 2 indicates the cryptographic algorithm used when the communication device performs secure boot, and a value of the parameter 2' indicates whether the parameter 2 is formally effective. For example, when the value of the parameter 2 is 1 and the value of the parameter 2' is also 1, the communication device uses the another cryptographic algorithm obtained from the outside during the secure boot. When the value of the parameter 2' is even if the value of the parameter 2 is 1, the communication device uses the default RSA rather than the another cryptographic algorithm obtained from the outside during the secure boot.

In still another example, the communication device may determine, based on the configuration information 1, the cryptographic algorithm used when the communication device performs secure boot. For example, the configuration information 1 may include indication information that indicates the cryptographic algorithm used when the communication device performs secure boot. For example, the configuration information 1 includes indication information 2. The indication information 2 indicates the communication device to use the another cryptographic algorithm obtained from the outside during the secure boot.

The secure storage entity mentioned in embodiments may be a one-time programmable memory in a processor, for example, may be a FLASH that cannot be second-edited in the processor, a one-time electrically programmable eFuse, a security chip in the processor, a read-only memory (ROM), or an external general-purpose memory having a secure storage function. This is not limited herein.

If the communication device needs to perform secure boot, and the cryptographic algorithm used by the communication device for the secure boot is an asymmetric cryptographic algorithm, for example, RSA, the communication device may perform secure boot by using the asymmetric cryptographic algorithm. For a secure boot process, refer to the foregoing description part of FIG. 1. Details are not described herein again.

If the communication device needs to perform secure boot, and the cryptographic algorithm used by the communication device for the secure boot is another cryptographic algorithm obtained from the outside, the communication device may continue to perform the following S101 to S103.

S101: Obtain external secure boot code ESBC, where the ESBC includes a code segment of a first cryptographic algorithm.

In this embodiment, the ESBC may be stored in an external storage entity independent of a processor. For example, the ESBC may be stored in a non-volatile storage medium. The non-volatile storage medium mentioned herein may be, for example, a flash.

After determining that a cryptographic algorithm used for secure boot is a cryptographic algorithm obtained from the outside, the communication device may read the ESBC stored in the non-volatile storage medium, store the ESBC in a static random access memory (SRAM) of the processor, and then obtain the ESBC from the SRAM.

The code segment of the first cryptographic algorithm in this embodiment is for describing the first cryptographic algorithm. In an example, the code segment of the first cryptographic algorithm may be a segment of software code.

S102: Perform an integrity check on the ESBC.

After the ESBC is obtained, to avoid a security risk caused by tampering of the first cryptographic algorithm in the ESBC, the integrity check may be performed on the ESBC in this embodiment. If the integrity check on the ESBC succeeds, it indicates that the code segment of the first cryptographic algorithm in the ESBC is not tampered with. Therefore, a signature of next-level software may be verified based on the first cryptographic algorithm.

In an implementation of this embodiment, during implementation of S102, integrity verification may be performed on the ESBC by using a baseline value of the ESBC. The baseline value of the ESBC may be stored in a secure storage entity. For the secure storage entity, refer to the foregoing related description part. Details are not described herein again. The communication device may obtain the baseline value of the ESBC stored in the secure storage entity, and then perform integrity verification on the ESBC by using the baseline value of the ESBC. The baseline value of the ESBC mentioned herein may be a hash value of the ESBC. In this case, the communication device may perform hash computation on the ESBC and compare an obtained computation result with the baseline value of the ESBC. If the two are the same, the integrity verification on the ESBC succeeds, or if the two are different, the integrity verification on the ESBC fails.

A hash algorithm can resist a post-quantum attack to some extent, and a longer length of a hash computation result indicates a stronger capability of the hash algorithm for resisting the post-quantum attack. For example, compared with a hash computation result of 128 bits, a hash computation result of 256 bits has a stronger capability of resisting the post-quantum attack than the hash computation result of 128 bits. Therefore, when the baseline value of the ESBC is the hash value of the ESBC, a risk of cracking and tampering of the ESBC can also be reduced to some extent. In addition, in this embodiment, a length of the baseline value of the ESBC may be further set to a long length (for example, 512 bits), to better resist the post-quantum attack.

In this embodiment, the baseline value of the ESBC stored in the secure storage entity may be pre-stored in the secure storage entity. For example, when the secure storage entity is an eFuse in the processor, the baseline value of the ESBC may be burnt into the eFuse in advance.

In an example, when the communication device is delivered from a factory, a corresponding storage area may be reserved for the secure storage entity in the communication device, so that the baseline value of the ESBC is subsequently stored in the reserved storage area. For example, when the communication device is delivered from a factory, a storage area 1 is reserved in the storage entity, and before the communication device uses the first cryptographic algorithm for the secure boot, the baseline value of the ESBC is stored in the storage area 1.

When the secure storage entity is the eFuse, the storage area may be, for example, a slot in the eFuse.

In an implementation, for one cryptographic algorithm, for example, the first cryptographic algorithm, a plurality of storage areas may be preset for the cryptographic algorithm in the secure storage entity to store the baseline value of the ESBC that includes the first cryptographic algorithm. The reason for doing this is that: When the secure storage entity is a one-time programmable memory, once the first cryptographic algorithm is modified, one unused storage area may be selected from the plurality of preset storage areas to store the baseline value of the ESBC that includes the first cryptographic algorithm. For example, when the first cryptographic algorithm is enabled for the first time, the baseline value of the ESBC that includes the first cryptographic algorithm is stored in the storage area 1 of the one-time programmable memory. Because the storage area 1 has been set once, a value of the storage area 1 cannot be changed. After the first cryptographic algorithm is subsequently modified, a baseline value of the ESBC that includes the modified first cryptographic algorithm changes. In this case, the changed baseline value may be stored in a storage area 2 of the one-time programmable memory. The first cryptographic algorithm is not limited in this embodiment. In an example, the first cryptographic algorithm may be a cryptographic algorithm that resists the post-quantum attack. In this way, after the ESBC that includes the first cryptographic algorithm is obtained from the outside, the signature of the next-level software may be verified by using the first cryptographic algorithm that resists the post-quantum attack. It can be understood that, according to this solution, the communication device can cope with a possible post-quantum attack at any time. In another example, the first cryptographic algorithm may alternatively be another cryptographic algorithm different from a default RSA algorithm. In this way, after the RSA algorithm is cracked, the first cryptographic algorithm may be used to verify the signature of the next-level software, to improve security.

S103: After the integrity check on the ESBC succeeds, verify the signature of the next-level software based on the first cryptographic algorithm.

In an implementation of this embodiment, in addition to the code segment of the first cryptographic algorithm, the ESBC may further include a root public key baseline value. The root public key baseline value is for performing integrity verification on a root public key of the first cryptographic algorithm. In this case, before performing S103, the communication device may further perform integrity verification on the root public key of the first cryptographic algorithm based on the root public key baseline value. The root public key baseline value mentioned herein may be the root public key or may be a hash value of the root public key. This is not limited in this embodiment.

In an example, in addition to the code segment for describing the first cryptographic algorithm and the root public key baseline value, the ESBC may further include a public key certificate. The public key certificate may include the root public key of the first cryptographic algorithm. In this way, the communication device may verify validity of the root public key based on the root public key in the public key certificate and the root public key baseline value. For example, when the root public key baseline value is the root public key, the root public key baseline value may be compared with the root public key in the public key certificate. If the two are the same, it is determined that the verification on the root public key succeeds, or if the two are different, it is determined that the verification on the root public key fails. For another example, when the root public key baseline value is the hash value of the root public key, a hash value of the root public key in the public key certificate may be calculated, and a calculation result is compared with the hash value of the root public key. If the two are the same, it is determined that the verification on the root public key succeeds, or if the two are different, it is determined that the verification on the root public key fails.

In an example, during implementation of S103, the signature of the next-level software may be verified by using the root public key of the first cryptographic algorithm. Therefore, if the verification on the root public key of the first cryptographic algorithm succeeds, a possible implementation of S103 is: verifying the signature of the next-level software based on the first cryptographic algorithm and the root public key of the first cryptographic algorithm.

In another example, when verifying the signature of the next-level software, the communication device may use a secondary public key of the first cryptographic algorithm. In this case, the public key certificate may further include the secondary public key and a signature of the public key certificate. In this case, the communication device may verify the signature of the public key certificate by using the verified root public key. It may be understood that, if the verification on the signature of the public key certificate succeeds, it indicates that the public key certificate is valid. Therefore, it may be considered that the secondary public key included in the public key certificate is valid. In addition, when it is determined that the integrity verification on the ESBC succeeds in S102, integrity of the secondary public key can also be ensured. In other words, if the verification on the public key certificate succeeds, it indicates that the secondary public key is valid and is not tampered with. Therefore, the signature of the next-level software may be verified by using the first cryptographic algorithm and the secondary public key of the first cryptographic algorithm.

For the secondary public key of the first cryptographic algorithm, it should be noted that, in an example, the secondary public key may be a derived key of the root public key, such as a key obtained through performing derivation on the root public key by using a key derivation algorithm.

In an example, for a communication device including a processor system, for example, a CPU system, a basic input/output system (BIOS) is the P t piece of software loaded when a CPU runs. Therefore, during implementation of S103, a signature of the BIOS may be verified by using the first cryptographic algorithm. For example, the signature of the BIOS may be verified by using the first cryptographic algorithm and a corresponding public key (for example, the root public key or the secondary public key). In addition, after the verification on the BIOS succeeds, the communication device may continue to verify a signature of OS code by using the first cryptographic algorithm and a corresponding public key (for example, a public key 1). After the verification on the signature of the OS code succeeds, the communication device may load the OS, and continue to verify a signature of an APP by using the first cryptographic algorithm and a corresponding public key (for example, a public key 2). After the verification on the signature of the APP succeeds, the communication device may securely load the APP.

In an example, before performing S103, the communication device may further enable, in the processor, the first cryptographic algorithm for the secure boot. After the first cryptographic algorithm is enabled for the secure boot, the communication device continues to perform "using the first cryptographic algorithm for the secure boot" in S103. In an example, the secure storage entity of the communication device may store indication information 3. The indication information 3 can indicate that the first cryptographic algorithm is enabled. In this case, after reading the indication information 3 from the secure storage entity, the communication device may determine that the first cryptographic algorithm is enabled for the secure boot. Further, the communication device may verify the signature of the next-level software based on the first cryptographic algorithm.

In some embodiments, the indication information 3 may be represented as a value of a parameter corresponding to the first cryptographic algorithm stored in the secure storage entity. In some embodiments, the secure storage entity stores a parameter 3. A value of the parameter 3 indicates whether the first cryptographic algorithm is enabled for the secure boot. For example, when the value of the parameter 3 is 0, it indicates that the first cryptographic algorithm is enabled. When the value of the parameter 3 is 1, it indicates that the first cryptographic algorithm is not enabled. In some other embodiments, the secure storage entity stores a parameter 3 and a parameter 3' that correspond to the first cryptographic algorithm, and the parameter 3 and the parameter 3' jointly indicate whether the first cryptographic algorithm is enabled. A value of the parameter 3 indicates whether the first cryptographic algorithm is enabled for the secure boot, and a value of the parameter 3' indicates whether the parameter 3 is formally effective. For example, when the value of the parameter 3 is 1, and the value of the parameter 3' is also 1, the first cryptographic algorithm is enabled for the secure boot. When the value of the parameter 3' is 0, regardless of whether the value of the parameter 3 is 0 or 1, the first cryptographic algorithm is not enabled for the secure boot. In some other embodiments, the indication information 3 may be one piece of indication information in the configuration information 1.

In some embodiments, if a cryptographic algorithm used for secure boot of the communication device at delivery is not the first cryptographic algorithm, before performing the foregoing method 100, the communication device may receive an algorithm enable file from another device, for example, network management, check the algorithm enable file, and after the check on the algorithm enable file succeeds, modify a value of each indication parameter in the secure storage entity based on an indication of the algorithm enable file, so that a cryptographic algorithm used during a secure boot process is determined based on the value of each indication parameter in the secure boot process. Alternatively, the communication device may modify a local configuration file based on the indication of the algorithm enable file, to obtain a configuration file 1, so as to determine, in the secure boot process, based on the configuration information 1, that the cryptographic algorithm used for the secure boot is the first cryptographic algorithm.

The algorithm enable file may include, for example, information related to an enabled algorithm and related verification information. For example, reference may be made to the following Table 1 for understanding.

TABLE 1

| No. | Parameter |
|-----|-----------|
| 1 | Action type |
| 2 | Algorithm root public key baseline value |
| 3 | Algorithm public key |
| 4 | Algorithm name |
| 5 | Preset slot of a baseline value of an ESBC file that includes the algorithm |
| 6 | Component identifier |
| 7 | Signature algorithm |
| 8 | File digital signature |

For the parameters shown in Table 1, the following should be noted.

The "action type" may include two types: one is algorithm enabling, and the other is algorithm forbidding. For the algorithm enable file, a type of the algorithm enable file is algorithm enabling.

In an example, the "algorithm enabling" may include two phases. Enabling the first cryptographic algorithm is used as an example. One phase is a phase that includes burning the baseline value (for example, a hash value) of the root public key of the first cryptographic algorithm, and the other phase is a phase in which the first cryptographic algorithm formally takes effect for the secure boot. In the two phases, the algorithm enable file may be delivered in each phase or may be delivered only once. This is not limited in this embodiment.

The algorithm root public key baseline value may be, for example, a hash value of an algorithm root public key.

The algorithm public key is a public key for verifying the next-level software, and the algorithm public key may be a root public key or a secondary public key.

The "algorithm name" indicates a name of the algorithm.

The "preset slot of a baseline value of an ESBC file that includes the algorithm" indicates a storage area, in the secure storage entity, corresponding to the baseline value of the ESBC file that includes the algorithm.

The "component identifier" indicates a device on which the algorithm is enabled.

The "file digital signature" is for verifying the algorithm enable file.

The "signature algorithm" indicates a signature algorithm used by the "file digital signature".

After receiving the algorithm enable file, the communication device may verify a signature of the algorithm enable file. After the verification succeeds, the communication device may obtain a baseline value of ESBC that includes an algorithm indicated by the algorithm enable file and store the baseline value in the secure storage entity.

In an example, after receiving the algorithm enable file corresponding to the first cryptographic algorithm, the communication device may store the baseline value of the ESBC including the code segment of the first cryptographic algorithm into the secure storage entity, so that the integrity check is performed on the ESBC based on the baseline value of the ESBC stored in the secure storage entity when S102 is performed.

In addition, after receiving the algorithm enable file corresponding to the first cryptographic algorithm, the communication device may further modify the values of the parameter 3 and the parameter 3', so that before performing "verifying the signature of the next-level software based on the first cryptographic algorithm" in S103, the communication device can determine that the first cryptographic algorithm has been enabled for the secure boot.

In an implementation, the communication device uses a second cryptographic algorithm for the secure boot before using the first cryptographic algorithm for the secure boot, that is, before using the first cryptographic algorithm for the secure boot, the communication device uses the second cryptographic algorithm to verify the signature of the next-level software. In this case, after the first cryptographic algorithm is used for the secure boot, the second cryptographic algorithm may be further forbidden from being used for the secure boot.

In an example, the communication device may receive an algorithm forbidding file sent by the network management. After the algorithm forbidding file is received, a value of an indication parameter corresponding to the second cryptographic algorithm in the secure storage entity is modified based on an indication of the algorithm forbidding file, to achieve an objective of forbidding the second cryptographic algorithm. Alternatively, the communication device may modify the configuration file 1 based on the indication of the algorithm forbidding file, to obtain a configuration file 2, so as to determine, based on configuration information 2 in the secure boot process, that the cryptographic algorithm used for the secure boot is the first cryptographic algorithm, and that the second cryptographic algorithm has been forbidden from being used for the secure boot. The network management mentioned in this embodiment may be a device running a network management system (NMS).

The algorithm forbidding file may include, for example, information related to a forbidden algorithm and related verification information. For a parameter included in the algorithm forbidding file, refer to the foregoing description part of Table 1. Details are not described herein again.

After receiving the algorithm forbidding file for forbidding the second cryptographic algorithm, the communication device may verify a signature of the algorithm forbidding file, and after the verification succeeds, may modify a parameter related to the second cryptographic algorithm in the secure storage entity. For example, a value of a parameter 4 corresponding to the second cryptographic algorithm may be modified, and the value of the parameter 4 indicates whether the second cryptographic algorithm is forbidden. In an example, the communication device may modify the value of the parameter 4 to 1 after the verification on the algorithm forbidding file succeeds. For another example, local configuration information is modified from the configuration information 1 to the configuration information 2.

The foregoing briefly describes the secure boot algorithm provided in the embodiments. The following describes, with reference to the embodiments, the secure boot algorithm.

First, related parameters stored in the secure storage entity are described. Refer to Table 2. Table 2 shows the parameters stored in the secure storage entity.

TABLE 2

| Parameter | Function |
| --- | --- |
| NS bit | Indicate whether secure boot is supported |
| RoTPK Hash (optional) | Hash value of a level-1 root public key of a current cryptographic algorithm |
| SubKey Category (optional) | Level-2 public subkey type of a current cryptographic algorithm |
| Sig_Alg_Control | Cryptographic algorithm enable control bit |
| Sig_Alg_Forbid | Cryptographic algorithm forbid control bit |
| L1_control | Whether to use a control bit of a cryptographic algorithm obtained from the outside |
| L1_control_lock | Lock bit of L1_control, indicating whether L1_control takes effect |
| L1_slot_control | Storage slot of a baseline value of ESBC that includes a currently enabled cryptographic algorithm |
| L1_slot_control_lock | Lock bit of L1_slot_control, indicating whether L1_slot_control takes effect |
| L1 Hash_slot1 | Baseline value stored in slot 1 |
| L1 Hash_slot2 | Baseline value stored in slot 2 |
| L1 Hash_slot3 | Baseline value stored in slot 3 |
| L1 Hash_slot4 | Baseline value stored in slot 4 |

For Sig_Alg_Control and Sig_Alg_Forbid, when a plurality of cryptographic algorithms may be stored in the external storage entity, each cryptographic algorithm may correspond to one enable control bit, and correspondingly, each cryptographic algorithm may correspond to one forbid control bit.

In an example, Sig_Alg_Control and Sig_Alg_Forbid may each include 8 bytes. It may be understood with reference to the following Table 3. For Sig_Alg_Control, the eight bytes respectively indicate an enable control bit of an algorithm 1, an enable control bit of an algorithm 2, an enable control bit of an algorithm 3, an enable control bit of an algorithm 4, and an enable control bit of an algorithm 5 from high to low, and the last three bytes are reserved. Similarly, for Sig_Alg_Forbid, the eight bytes respectively indicate a forbid control bit of the algorithm 1, a forbid control bit of the algorithm 2, a forbid control bit of the algorithm 3, a forbid control bit of the algorithm 4, and a forbid control bit of the algorithm 5 from high to low, and the last three bytes are reserved. The algorithm 1 may be, for example, default RSA, and the algorithm 2, the algorithm 3, the algorithm 4, and the algorithm 5 may be cryptographic algorithms stored in the external storage entity.

TABLE 3

| Sig_Alg_Control/Sig_Alg_Forbid (8 Byte) | | | | | |
|---|---|---|---|---|---|
| Algorithm 1 (1 byte) | Algorithm 2 (1 byte) | Algorithm 3 (1 byte) | Algorithm 4 (1 byte) | Algorithm 5 (1 byte) | Reserved (3 bytes) |

The following describes the secure boot method in the embodiments by using an example in which the algorithm 1 corresponds to the second cryptographic algorithm in the method 100 and the algorithm 2 corresponds to the first cryptographic algorithm in the method 100.

In an example, when the communication device is delivered from a factory, a cryptographic algorithm enable file 1 may be preset. The cryptographic algorithm enable file 1 indicates that a cryptographic algorithm used for the secure boot is the algorithm 1 (for example, RSA). In this case, an "action type" parameter in the cryptographic algorithm enable file 1 may be, for example, the following.

| Algorithm forbid (Alg_Forbid) | Root public key baseline value (RoTPK Hash) | Description |
|---|---|---|
| 0-0-0-0-0 | X-0-0-0-0 | Use a default RSA algorithm. |

Alg_Forbid includes eight bits, and the first five bits in descending order are algorithm forbid control bits of the algorithm 1 to the algorithm 5 respectively. X may be 0 or 1.

RoTPK Hash may also include eight bits, and the first five bits in descending order are respectively root public key baseline value control bits of the algorithm 1 to the algorithm 5.

The communication device modifies a value of L1_control in the secure storage entity to 0 and modifies a value of L1_control_lock to 1 based on the cryptographic algorithm enable file 1. The parameter L1_control mentioned herein may correspond to the parameter 2 in the foregoing method 100, and the L1_control_lock mentioned herein may correspond to the parameter 2' in the foregoing method 100.

After the communication device runs for a period of time, the communication device may receive a cryptographic algorithm enable file 2 sent by the network management, and an "action type" parameter in the cryptographic algorithm enable file 2 may be, for example, the following.

| Algorithm forbid (Alg_Forbid) | Root public key baseline value (RoTPK Hash) | Description |
|---|---|---|
| 0-0-0-0-0 | X-1-0-0-0 | Indicate to burn a hash value of a level-1 root public key for the algorithm 2 |

After receiving the cryptographic algorithm enable file 2, the communication device may verify a signature of the cryptographic algorithm enable file 2. After the verification on the signature of the cryptographic algorithm enable file 2 succeeds, the communication device may modify the value of L1_control in the secure storage entity to 1, store the hash value of the level-1 root public key of the algorithm 2 into the secure storage entity, and modify a control bit corresponding to the algorithm 2 in Sig_Alg_Control in the secure storage entity, for example, modify the value of Sig_Alg_Control to 1-1-0-0-0 and store a baseline value of ESBC that includes the algorithm 2 in the secure storage entity. In an example, the baseline value of the ESBC that includes the algorithm 2 may be stored into a corresponding slot in the secure storage entity based on the parameter "preset slot of a baseline value of an ESBC file that includes the algorithm" in the cryptographic algorithm enable file 2, and values of L1_slot_control and L1_slot_control_lock are correspondingly modified. For example, in the cryptographic algorithm enable file, if a value of the parameter "preset slot of a baseline value of an ESBC file that includes the algorithm" is 2, the communication device may store the baseline value of the ESBC that includes the algorithm 2 into corresponding slot 2 in the secure storage entity, modify the value of the parameter L1_slot_control in the secure storage entity to 2, and set the value of L1_slot_control_lock to 1.

Then, the communication device continues to receive a cryptographic algorithm enable file 3 sent by the network management, and an "action type" parameter in the cryptographic algorithm enable file 3 may be, for example, the following.

| Algorithm forbid (Alg_Forbid) | Root public key baseline value (RoTPK Hash) | Description |
|---|---|---|
| 0-0-0-0-0 | X-1-0-0-0 | Enable the algorithm 2 for the secure boot |

After receiving the cryptographic algorithm enable file 3, the communication device may verify a signature of the cryptographic algorithm enable file 3. After the verification on the signature of the cryptographic algorithm enable file 3 succeeds, because the value of Sig_Alg_Control is 1-1-0-0-0, the communication device modifies the value of L1_control_lock to 1, to indicate that the value of L1_control is formally effective. Then, the communication device may perform S101 to S103 in the foregoing method 100, to implement the secure boot by using the algorithm 2.

After enabling the algorithm 2 for the secure boot, the communication device may continue to receive a cryptographic algorithm forbidding file 4 sent by the network management. An "action type" parameter in the cryptographic algorithm forbidding file 4 may be, for example, the following.

| Algorithm forbid (Alg_Forbid) | Root public key baseline value (RoTPK Hash) | Description |
|---|---|---|
| 1-0-0-0-0 | X-1-0-0-0 | Forbid the algorithm 1 |

After receiving the cryptographic algorithm forbidding file 4, the communication device may verify a signature of the cryptographic algorithm forbidding file 4. After the verification on the signature of the cryptographic algorithm forbidding file 4 succeeds, because the value of Alg_Forbid is 1-0-0-0-0, the communication device modifies the value of Sig_Alg_Forbid in the secure storage entity to 1-0-0-0-0, to indicate that the algorithm 1 is forbidden. The highest byte of Sig_Alg_Forbid mentioned herein may correspond to the parameter 4 in the foregoing method 100.

An embodiment further provides a secure boot method. FIG. 3 is a schematic flowchart of a secure boot method according to an embodiment. The secure boot method 200 shown in FIG. 3 may include, for example, the following S201 and S202.

S201: Perform secure boot based on a second crypto-graphic algorithm in a first communication period.

S202: In a second communication period, perform secure boot based on a first cryptographic algorithm obtained from the outside of a first device.

The first communication period and the second communication period are two different periods. In an example, an end moment of the first communication period may be a start moment of the second communication period. In an example, the second cryptographic algorithm is a cryptographic algorithm preset when the first device is delivered from a factory. For example, when the communication device is delivered from a factory, the second cryptographic algorithm is for performing secure boot. The first communication period ends, and the second communication period is entered. In the second communication period, the secure boot is performed by using the first cryptographic algorithm. In another example, the second cryptographic algorithm may alternatively be a cryptographic algorithm obtained from the outside of the device after the first device is delivered from a factory. For example, as shown in the foregoing embodiment, in a secure boot process, a code segment corresponding to the second cryptographic algorithm is obtained from external secure boot code, to obtain the second cryptographic algorithm.

For implementation of performing secure boot by using the externally obtained first cryptographic algorithm or the second cryptographic algorithm, refer to the foregoing description part of the method 100. Details are not described herein again. For an implementation of performing secure boot by using the internally preset second cryptographic algorithm, refer to the foregoing description part of the secure boot manner shown in FIG. 1. Details are not described herein again.

An embodiment further provides a secure boot apparatus. FIG. 4 is a schematic diagram of a structure of a secure boot apparatus according to an embodiment.

The secure boot apparatus 400 shown in FIG. 4 may include, for example, an obtaining unit 401 and a processing unit 402.

The obtaining unit 401 is configured to obtain external secure boot code ESBC, where the ESBC includes a code segment of a first cryptographic algorithm.

The processing unit 402 is configured to perform an integrity check on the ESBC.

The processing unit 402 is further configured to: after the integrity check on the ESBC succeeds, verify a signature of next-level software based on the first cryptographic algorithm.

In an implementation, the ESBC further includes a root public key baseline value, and the processing unit 402 is further configured to perform integrity verification on a root public key of the first cryptographic algorithm based on the root public key baseline value before verifying the next-level software based on the first cryptographic algorithm.

In an implementation, the processing unit 402 is further configured to: after performing integrity verification on the root public key of the first cryptographic algorithm, verify a signature of a public key certificate based on the root public key of the first cryptographic algorithm, where the public key certificate includes a secondary public key of the first cryptographic algorithm.

The verifying a signature of next-level software based on the first cryptographic algorithm includes:

after the verification on the signature of the public key certificate succeeds, verifying the signature of the next-level software based on the first cryptographic algorithm and the secondary public key.

In an implementation, the first cryptographic algorithm is a post-quantum algorithm for resisting a post-quantum attack.

In an implementation, the performing an integrity check on the ESBC includes:

performing the integrity check on the ESBC based on a baseline value of the ESBC stored in a secure storage entity.

In an implementation, the secure storage entity is a one-time programmable memory in the processor or a security chip in the processor.

In an implementation, the processing unit 402 is further configured to: before verifying the signature of the next-level software based on the first cryptographic algorithm, enable, in the processor, the first cryptographic algorithm for secure boot.

In an implementation, the enabling, in the processor, the first cryptographic algorithm for secure boot includes:

obtaining indication information, where the indication information indicates that the first cryptographic algo-rithm is enabled for the secure boot.

In an implementation, the processing unit 402 is further configured to: after performing the integrity check on the ESBC, forbid, in the processor, use of a second crypto-graphic algorithm for the secure boot, where the second cryptographic algorithm is for verifying the signature of the next-level software before the first cryptographic algorithm is enabled.

In an implementation, the verifying a signature of next-level software based on the first cryptographic algorithm includes:

verifying a signature of basic input/output system BIOS code based on the first cryptographic algorithm.

In an implementation, the processing unit 402 is further configured to:

verify a signature of operating system OS code based on the first cryptographic algorithm; and verify, based on the first cryptographic algorithm, a sig-nature of an application APP loaded by the OS.

In an implementation, the obtaining unit 401 is configured to:

obtain the ESBC from a static random access memory SRAM of the processor.

In an implementation, the processing unit 402 is further configured to:

before obtaining the ESBC from the SRAM of the pro-cessor, store, in the SRAM, the external secure boot code ESBC stored in a non-volatile storage medium.

For implementation of functions corresponding to the units of the apparatus 400, refer to the foregoing related description part of the method 100. Details are not described herein again.

Figure 5:
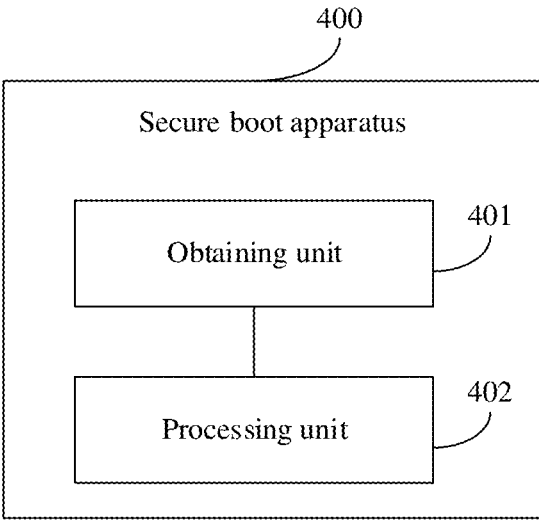
FIG. 5 is a schematic diagram of a structure of a communication apparatus according to an embodiment.

In addition, an embodiment further provides a communi-cation apparatus 500. FIG. 5 is a schematic diagram of a structure of a communication apparatus according to an embodiment.

The communication apparatus 500 may be configured to perform the method 100 or the method 200 in the foregoing embodiments.

As shown in FIG. 5, the communication apparatus 500 may include a processor 510 and a memory 520 coupled to the processor 510. The processor 510 may be a central processing unit (CPU), a network processor (NP), or a combination of a CPU and an NP. Alternatively, the processor may be an application-specific integrated circuit (ASIC), a programmable logic device (PLD), or a combination thereof. The PLD may be a complex programmable logic device (CPLD), a field-programmable gate array (FPGA), generic array logic (GAL), or any combination thereof. The processor 510 may be one processor or may include a plurality of processors. The memory 520 may include a volatile memory, for example, a random-access memory (RAM). Alternatively, the memory may include a non-volatile memory, for example, a read-only memory (ROM), a flash memory, a hard disk drive (HDD), or a solid-state drive (SSD). Alternatively, the memory 520 may include a combination of the foregoing types of the plurality of memories. The memory 520 may be one memory or may include a plurality of memories. In an implementation, the memory 520 stores a computer-readable instruction, and the computer-readable instruction includes a plurality of software modules, for example, a sending module 521, a processing module 522, and a receiving module 523. After executing each software module, the processor 510 may perform a corresponding operation according to an indication of each software module. In this embodiment, an operation performed by a software module is actually an operation performed by the processor 510 according to an indication of the software module.

In an example, the communication apparatus 500 may perform the method 100 in the foregoing embodiment. When the communication apparatus 500 is configured to perform the method 100 in the foregoing embodiment, the processor 510 is configured to: execute a related instruction in the memory 520, to obtain external secure boot code ESBC, where the ESBC includes a code segment of a first cryptographic algorithm; perform an integrity check on the ESBC; and after the integrity check on the ESBC succeeds, verify a signature of next-level software based on the first cryptographic algorithm.

In an example, the communication apparatus 500 may perform the method 200 in the foregoing embodiment. When the communication apparatus 500 is configured to perform the method 200 in the foregoing embodiment, the processor 510 is configured to: execute a related instruction in the memory 520, to perform secure boot based on a second cryptographic algorithm in a first communication period; and perform secure boot based on a first cryptographic algorithm obtained from the outside of a first device in a second communication period.

For the communication apparatus (for example, the secure boot apparatus 400 and the communication apparatus 500) mentioned in embodiments, it should be noted that the communication apparatus may be a communication device or may be some components of the communication device. For example, when the communication device is a network device, the communication apparatus may be a network device, for example, a switch or a router, or may be some components on the network device, for example, a board or a line card on the network device or may be one function module on the network device, or may be a chip configured to implement the method. This is not limited in the embodiments.

In an example, functions performed by the obtaining unit 401 and the processing unit 402 in the apparatus 400 may be performed by a processor. The processor may be, for example, the processor shown in the apparatus 500.

In addition, an embodiment further provides a secure storage entity. The secure storage entity includes at least one reserved storage area. The at least one reserved storage area is for storing a baseline value of external secure boot code ESBC before a first cryptographic algorithm is enabled for secure boot. The ESBC includes a code segment of the first cryptographic algorithm.

In an implementation, the secure storage entity is a one-time programmable memory or a security chip. For example, the secure storage entity may be, for example, a one-time programmable memory in a processor, and the processor may be the processor in the apparatus 500 described above.

In an implementation, the one-time programmable memory is a one-time electrically programmable electronic fuse eFuse, and the storage area is a reserved slot in the eFuse.

For related descriptions of the secure storage entity, refer to the description part about the secure storage entity in the method 100. Details are not described herein again. For the baseline value of the ESBC stored in the secure storage entity, refer to a related description part of the baseline value of the ESBC in the method 100. Details are not described herein again.

In addition, an embodiment provides a communication apparatus. The communication apparatus includes the foregoing secure storage entity. The communication apparatus may be, for example, configured to perform the foregoing method 100 or method 200. In an example, the communication apparatus may alternatively be the apparatus 400 or the apparatus 500 that includes the secure storage entity.

In addition, the embodiments may further provide a non-transitory computer-readable storage medium. The non-transitory computer-readable storage medium stores instructions. When the instructions are run on a computer, the computer is enabled to perform any one or more operations in the method (for example, the method 100 and the method 200) in any one of the foregoing embodiments.

In addition, the embodiments may further provide a computer program product, including a computer program. When the computer program product runs on a computer, the computer is enabled to perform any one or more operations in the method (for example, the method 100 and the method 200) in any one of the foregoing embodiments.

In the embodiments and accompanying drawings, the terms "first", "second", "third", "fourth", and so on (if existent) are intended to distinguish between similar objects but do not necessarily indicate an order or sequence. It should be understood that the data termed in such a way are interchangeable in proper circumstances so that embodiments described herein can be implemented in other orders than the order illustrated or described herein. In addition, the terms "include" and "have" and any other variants are intended to cover the non-exclusive inclusion. For example, a process, method, system, product, or device that includes a list of steps or units is not necessarily limited to those expressly listed steps or units but may include other steps or units not expressly listed or inherent to such a process, method, product, or device.

It may be clearly understood by persons skilled in the art that, for the purpose of convenient and brief description, for a detailed working process of the foregoing system, apparatus, and unit, refer to a corresponding process in the foregoing method embodiments, and details are not described herein again.

In the several embodiments, it should be understood that the system, apparatus, and method may be implemented in another manner. For example, the described apparatus embodiments are merely examples. For example, division into units is merely logical service division and may be another division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, in other words, may be located in one position, or may be distributed on a plurality of network units. Some or all of the units may be selected based on actual requirements to achieve the objectives of the solutions of embodiments.

In addition, service units in the embodiments may be integrated into one processing unit, or each of the units may exist alone physically, or two or more units may be integrated into one unit. The integrated unit may be implemented in a form of hardware or may be implemented in a form of a software service unit.

When the integrated unit is implemented in a form of a software service unit and sold or used as an independent product, the integrated unit may be stored in a computer-readable storage medium. Based on such an understanding, the embodiments may be implemented in a form of a software product. The computer software product is stored in a storage medium and includes several instructions for instructing a computer device (which may be a personal computer, a server, a network device, or the like) to perform all or some of the steps of the methods in embodiments. The storage medium includes any medium that can store program code, such as a USB flash drive, a removable hard disk, a read-only memory (ROM), a random access memory (RAM), a magnetic disk, or an optical disc.

Persons skilled in the art can be aware that, in the foregoing one or more examples, services may be implemented by using hardware, software, firmware, or any combination thereof. When the services are implemented by using the software, the services may be stored in a non-transitory computer-readable medium. The computer-readable medium includes a computer storage medium that may be any available medium accessible to a general-purpose or a dedicated computer.

In the foregoing implementations, the objectives and benefits are further described in detail. It should be understood that the foregoing descriptions are merely implementations.

The foregoing embodiments are merely intended to describe but not to limit. Although described in detail with reference to the foregoing embodiments, persons of ordinary skill in the art should understand that they may still make modifications without departing from the scope of the solutions of the embodiments.

22

What is claimed is:

1. A secure boot method comprising:
storing a baseline value of an external secure boot code (ESBC) stored in a secure storage entity,
    wherein the baseline value is a hash value of the ESBC,
    wherein secure storage entity comprises at least a reserved storage area configured to store the baseline value of the ESBC
obtaining the ESBC, wherein the ESBC comprises a code segment of a first cryptographic algorithm;
enable the ESBC for a secure boot,
performing an integrity check on the ESBC based on the baseline value of the ESBC; and
after the integrity check on the ESBC succeeds, verifying a signature of next-level software based on the first cryptographic algorithm,
    wherein the first cryptographic algorithm is a post-quantum algorithm for resisting a post-quantum attack.

2. The secure boot method according to claim 1, wherein the ESBC further comprises a root public key baseline value, and,
before verifying the next-level software based on the first cryptographic algorithm, the method further comprises:
performing integrity verification on a root public key of the first cryptographic algorithm based on the root public key baseline value.

3. The secure boot method according to claim 2, wherein, after performing the integrity verification on the root public key of the first cryptographic algorithm, the method further comprises:
verifying a signature of a public key certificate based on the root public key of the first cryptographic algorithm, wherein the public key certificate comprises a secondary public key of the first cryptographic algorithm; and verifying the signature of the next-level software based on the first cryptographic algorithm further comprises:
after the verification on the signature of the public key certificate succeeds, verifying the signature of the next-level software based on the first cryptographic algorithm and the secondary public key.

4. The secure boot method according to claim 1, wherein before verifying the signature of the next-level software based on the first cryptographic algorithm, the method further comprises:
enabling, in the processor, the first cryptographic algorithm for secure boot.

5. The secure boot method according to claim 4, wherein enabling, in the processor, the first cryptographic algorithm for the secure boot further comprises:
obtaining indication information, wherein the indication information indicates that the first cryptographic algorithm is enabled for the secure boot.

6. The secure boot method according to claim 5, further comprising:
receiving an algorithm enable file;
checking the algorithm enable file;
after checking the algorithm enable file succeeds, modifying a value of an indication parameter, wherein the value of the indication parameter of represents the indication information and is stored in a secure storage entity.

7. The secure boot method according to claim 5, further comprising:
receiving an algorithm enable file;
modifying a local configuration file based on an indication of the algorithm enable file; and determining, based on the indication information in the modified local configuration file, that the cryptographic algorithm used for the secure boot is the first cryptographic algorithm.

8. The secure boot method according to claim 1, wherein, after performing the integrity check on the ESBC, the method further comprises:

forbidding, in the processor, use of a second cryptographic algorithm for the secure boot, wherein the second cryptographic algorithm is for verifying the signature of the next-level software before the first cryptographic algorithm is enabled.

9. The secure boot method according to claim 1, wherein verifying the signature of the next-level software based on the first cryptographic algorithm further comprises:

verifying a signature of basic input/output system (BIOS) code based on the first cryptographic algorithm.

10. The secure boot method according to claim 1, further comprising:

verifying a signature of operating system (OS) code based on the first cryptographic algorithm; and verifying, based on the first cryptographic algorithm, a signature of an application (APP) loaded by the OS.

11. The secure boot method according to claim 1, wherein obtaining the external secure boot code further comprises:

obtaining the ESBC from a static random access memory (SRAM) of the processor.

12. The secure boot method according to claim 11, wherein, before obtaining the ESBC from the SRAM of the processor, the method further comprises: storing, in the SRAM, the ESBC stored in a non-volatile storage medium.

13. A communication apparatus, comprising at least one processor and a memory coupled with the one or more processors, wherein the memory comprising instructions, when executed by the at least one processor, cause the communication apparatus to perform the following operations:

storing a baseline value of an external secure boot code (ESBC) stored in a secure storage entity, wherein the baseline value is a hash value of the ESBC, wherein secure storage entity comprises at least a reserved storage area configured to store the baseline value of the ESBC obtaining the ESBC, wherein the ESBC comprises a code segment of a first cryptographic algorithm; and enable the ESBC for a secure boot, performing an integrity check on the ESBC based on the baseline value of the ESBC;

wherein after the integrity check on the ESBC succeeds, verifying a signature of next-level software based on the first cryptographic algorithm, wherein the first cryptographic algorithm is a post-quantum algorithm for resisting a post-quantum attack.

14. The communication apparatus according to claim 13, wherein the ESBC further comprises a root public key baseline value, and the instructions when executed by the processor further cause the communication apparatus to:

perform integrity verification on a root public key of the first cryptographic algorithm based on the root public key baseline value before verifying the next-level software based on the first cryptographic algorithm.

15. The communication apparatus according to claim 14, wherein instructions when executed by the processor further cause the communication apparatus to:

after performing integrity verification on the root public key of the first cryptographic algorithm, verify a signature of a public key certificate based on the root public key of the first cryptographic algorithm, wherein the public key certificate comprises a secondary public key of the first cryptographic algorithm; and verifying the signature of the next-level software based on the first cryptographic algorithm further comprises:

after the verification on the signature of the public key certificate succeeds, verify the signature of the next-level software based on the first cryptographic algorithm and the secondary public key.

16. The communication apparatus of claim 13, wherein, the instructions when executed by the processor further cause the communication apparatus to:

perform the integrity check on the ESBC based on a baseline value of the ESBC stored in a secure storage entity.

17. A secure storage entity, wherein the secure storage entity comprises:

at least one reserved storage area configured to store a baseline value of an external secure boot code (ESBC), before a first cryptographic algorithm is enabled for secure boot, wherein the baseline value is a hash value of the ESBC, wherein the ESBC comprises a code segment of a first cryptographic algorithm; and where in the first cryptographic algorithm is a post-quantum algorithm for resisting a post-quantum attack, and instructions stored on the non-transitory computer readable medium that when executed by one or more processors, causes the one or more processors to:

obtaining the ESBC enable the ESBC for a secure boot, performing an integrity check on the ESBC based on the baseline value stored in the at least one reserved storage area, and and after the integrity check on the ESBC succeeds, verifying a signature of next-level software based on the first cryptographic algorithm.

18. The non-transitory computer readable storage medium of claim 17, wherein the a one-time programmable memory is an eFuse, and the storage area is a slot in the eFuse.

* * * * *